(12) United States Patent
Tamada et al.

(10) Patent No.: US 7,306,080 B2
(45) Date of Patent: Dec. 11, 2007

(54) IMPACT ABSORBING MEMBER FOR VEHICLE

(75) Inventors: Teruo Tamada, Yokohama (JP); Hiroo Inui, Nagoya (JP); Kiyotaka Urakawa, Katano (JP); Kenji Ishii, Nagoya (JP); Tadatoshi Tanji, Fujisawa (JP)

(73) Assignee: Kyoraku Co., Ltd., Tokyo (JP)

( * ) Notice: Subject to any disclaimer, the term of this patent is extended or adjusted under 35 U.S.C. 154(b) by 248 days.

(21) Appl. No.: 11/130,616

(22) Filed: May 17, 2005

(65) Prior Publication Data

US 2005/0230204 A1  Oct. 20, 2005

Related U.S. Application Data

(63) Continuation-in-part of application No. 10/698,537, filed on Oct. 31, 2003, now abandoned.

(30) Foreign Application Priority Data

| Oct. 31, 2002 | (JP) | 2002-319160 |
| Oct. 31, 2002 | (JP) | 2002-319161 |
| Oct. 31, 2002 | (JP) | 2002-319162 |
| Oct. 31, 2002 | (JP) | 2002-319163 |
| Jan. 31, 2003 | (JP) | 2003-025254 |
| Jan. 31, 2003 | (JP) | 2003-025255 |
| Jan. 31, 2003 | (JP) | 2003-025256 |
| Jan. 31, 2003 | (JP) | 2003-025257 |
| Jan. 31, 2003 | (JP) | 2003-025258 |
| Feb. 28, 2003 | (JP) | 2003-054856 |
| Feb. 28, 2003 | (JP) | 2003-054857 |
| Feb. 28, 2003 | (JP) | 2003-054858 |
| Mar. 31, 2003 | (JP) | 2003-097349 |
| May 14, 2003 | (JP) | 2003-135249 |

(51) Int. Cl.
*F16F 7/12* (2006.01)

(52) U.S. Cl. ........................ 188/377; 293/120; 188/371

(58) Field of Classification Search ................ 188/371, 188/376, 377; 293/120, 133
See application file for complete search history.

(56) References Cited

U.S. PATENT DOCUMENTS

| 3,919,353 | A | * | 11/1975 | Castelnuovo et al. ......... 525/69 |
| 4,925,224 | A | | 5/1990 | Smiszek |
| 5,296,538 | A | * | 3/1994 | Orikasa et al. ............... 525/63 |
| 5,367,016 | A | * | 11/1994 | Miyama et al. ............. 524/537 |
| 5,438,098 | A | * | 8/1995 | Orikasa et al. ............... 525/63 |

(Continued)

FOREIGN PATENT DOCUMENTS

JP  10250513  9/1998

(Continued)

*Primary Examiner*—Chris Schwartz
(74) *Attorney, Agent, or Firm*—Vern Maine & Associates

(57) ABSTRACT

A system is provided for absorbing energy from impacts to a vehicle, the system comprising: a blow molded energy absorbing member. The member including first and second opposing walls, at least one rib or a pair of ribs disposed between said first and second opposing walls, the rib(s) comprising the first and second opposing walls dented toward other wall with top end part either welded or separated with specified interval. In one embodiment, the energy absorbing member is formed of thermoplastics composed of a polyolefin based resin and 50 to 75% weight of an amorphous resin.

16 Claims, 6 Drawing Sheets

U.S. PATENT DOCUMENTS

| | | |
|---|---|---|
| 5,806,889 A | 9/1998 | Suzuki et al. |
| 6,082,792 A | 7/2000 | Evans et al. |
| 6,085,878 A | 7/2000 | Araki et al. |
| 6,406,079 B2 | 6/2002 | Tamada et al. |

FOREIGN PATENT DOCUMENTS

| | | |
|---|---|---|
| JP | 2002187508 | 7/2002 |
| JP | 2002201322 | 7/2002 |

* cited by examiner

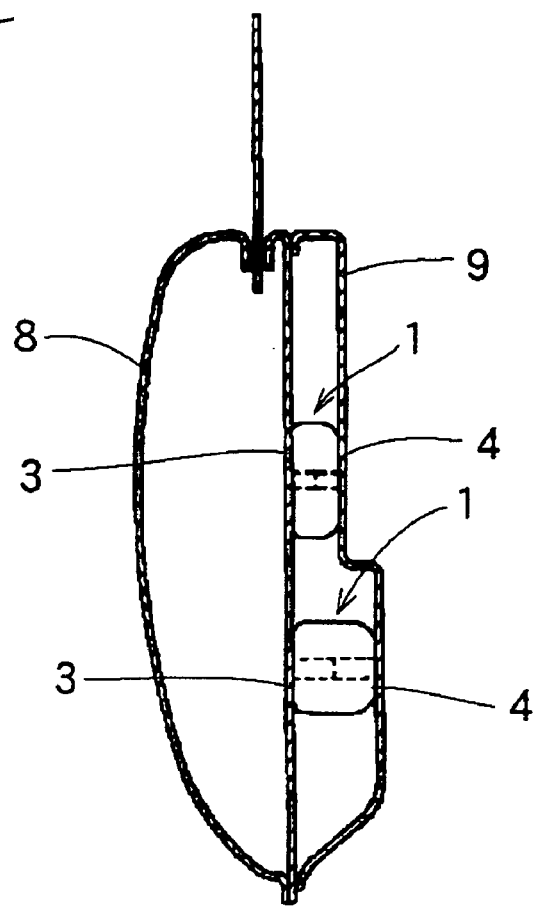
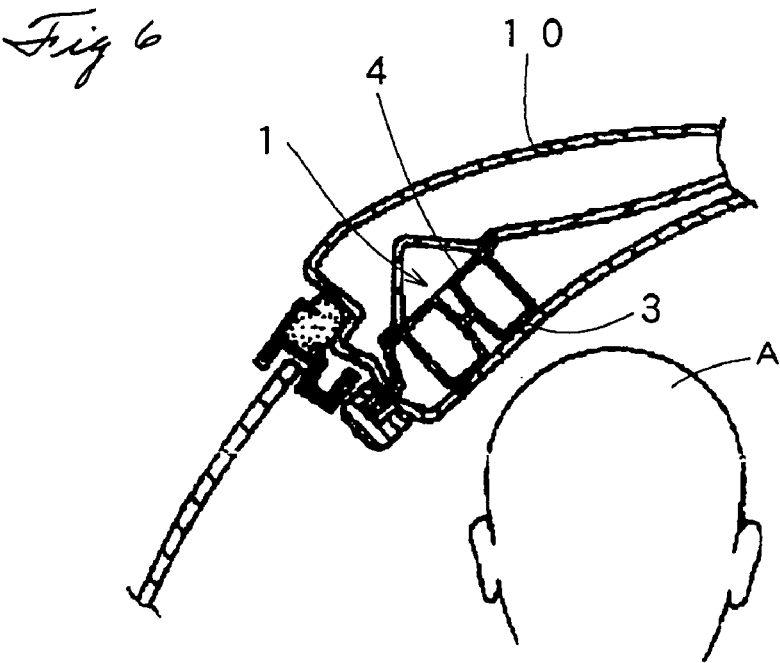

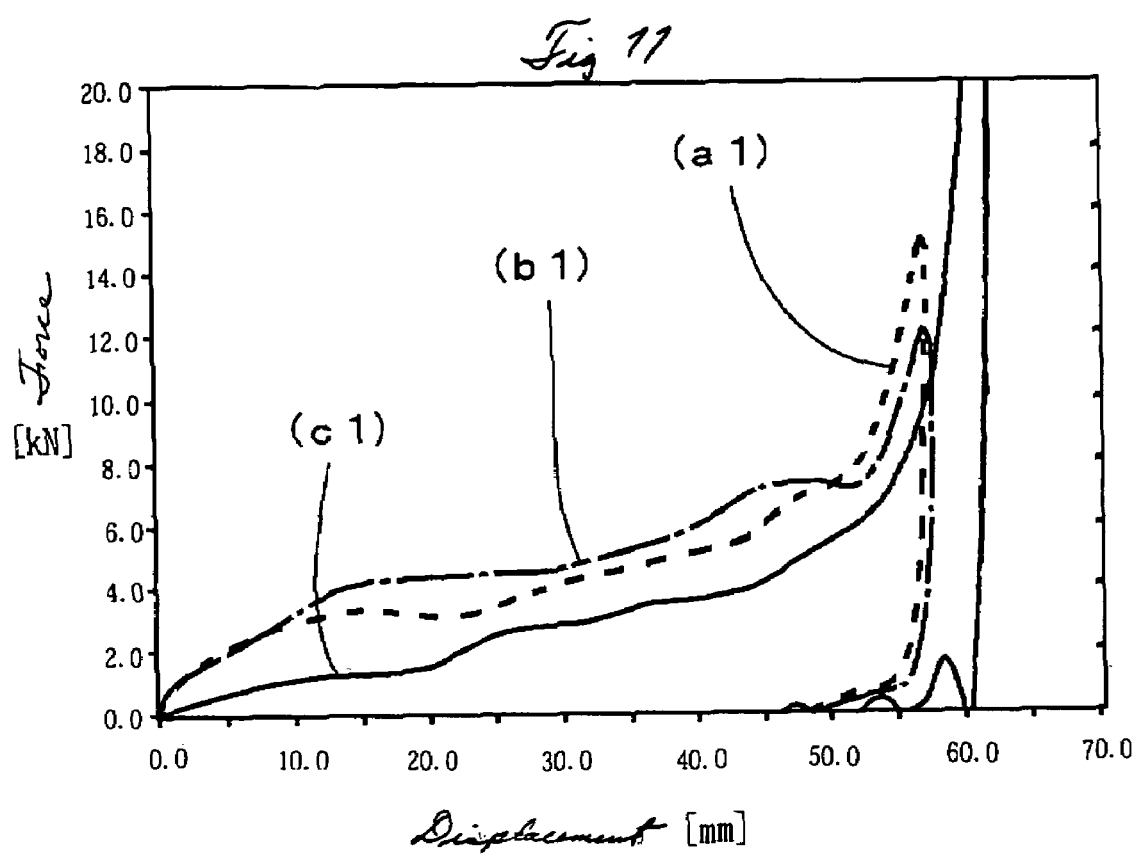

IMPACT ABSORBING MEMBER FOR VEHICLE

RELATED APPLICATIONS

This application is a Continuation-in-part Application which claims benefit of U.S. application Ser. No. 10/698,537, filed Oct. 31, 2003, now abandoned, which in turn claims the priority to Japanese Application Number 2002-319160 filed on Oct. 31, 2002, Japanese Application Number 2002-319161 filed on Oct. 31, 2002, Japanese Application Number 2002-319162 filed on Oct. 31, 2002, Japanese Application Number 2002-319163 filed on Oct. 31, 2002, Japanese Application Number 2003-025254 filed on Jan. 31, 2003, Japanese Application Number 2003-025255 filed on Jan. 31, 2003, Japanese Application Number 2003-025256 filed on Jan. 31, 2003, Japanese Application Number 2003-025257 filed on Jan. 31, 2003, Japanese Application Number 2003-025258 filed on Jan. 31, 2003, Japanese Application Number 2003-054856 filed on Feb. 28, 2003, Japanese Application Number 2003-054857 filed on Feb. 28, 2003, Japanese Application Number 2003-054858 filed on Feb. 28, 2003, Japanese Application Number 2003-097349 filed on Mar. 31, 2003, and Japanese Application Number 2003-135249 filed on May 14, 2003.

FIELD OF THE INVENTION

The present invention relates to an impact energy absorbing member, more particularly an energy absorbing member provided inside a vehicle structural member such as a door, a door trim, a body side panel, a roof panel, a pillar, a bumper, a seat, and instrument panel of an vehicle or the like for absorbing the impact energy from the inside such as the collision of a passenger against the inner wall of the vehicle structural member or the impact energy from the outside such as the collision with another vehicle.

BACKGROUND OF THE INVENTION

The official gazette of Japanese Patent Application Laid Open (JP-A) No. 2002-187508 discloses a hollow double wall structure for the absorption of impact energies to vehicles such as automobiles. This structure is produced by blow molding of thermoplastics, forming recessed ribs from the front surface wall and the rear surface wall with the top end parts thereof bonded with each other so as to be integrated for improving the energy absorbing property. Moreover, the official gazette of Japanese Patent No. 3,313,999 discloses an energy absorbing member made of a polypropylene resin having a 5,000 kg/cm2 to 25,000 kg/cm2 flexural modulus. Furthermore, the official gazette of Japanese Patent Application Laid Open (JP-A) No. 2002-201322 discloses one made of a polypropylene resin composition including a polypropylene component and a copolymer component of a propylene and an ethylene. According to the energy absorbing member disclosed in the above-mentioned official gazette of Japanese Patent, a sufficient shock absorbing property can be obtained by forming an interlocking rib for integrally linking a plurality of recessed ribs, or the like as shown in the official gazette of Japanese Patent Application Laid Open (JP-A) No. 2002-187508. However, it has been considered important that enhanced shock absorbing property particularly at low temperature is obtained. Regarding the energy absorbing member made of a polypropylene resin having a 5,000 kg/cm2 to 25,000 kg/cm2 flexural modulus, disclosed in the official gazette of Japanese Patent No. 3,313,999, it was afterwards discovered that the stress change at the time of energy absorption at 60° C. to −15° C. is large and the energy absorbing performance is effected by the outside air temperature. That is, with the load stress at a 50% compression distortion of a polypropylene energy absorbing member provided as the reference at an ordinary temperature, the stress change ratio is 21% in the case the outside air temperature is −15° C., and the stress change ratio is −34% in the case the outside air temperature is 60° C.

Since the stress change ratio of the energy absorbing member is required to be kept within ±10% at the temperature from −15° C. to 60° C., with respect to the compression distortion at ordinary temperature, the impact absorbing member formed of a polypropylene resin having a 5,000 kg/cm2 to 25,000 kg/cm2 flexural modulus disclosed in the official gazette of Japanese Patent No. 3,313,999 can not provide the required level of performance.

BRIEF SUMMARY OF THE INVENTION

One embodiment of the present invention provides a system for absorbing energy from an impact, that system comprising: an energy absorbing member comprising first and second opposing walls; at least one rib disposed between the first and second opposing walls; energy absorbing member comprising a thermoplastic, the thermoplastic comprising a polyolefin based resin and 50-75% by weight of an amorphous resin.

Another embodiment of the present invention provides such a system wherein the thermoplastic has a flexural modulus of between about approximately 9,000 kg/cm$^2$ and about approximately 22,000 kg/cm$^2$.

A further embodiment of the present invention provides such a system wherein the thermoplastic has a 15 to 40 kg/cm$^2$ Izod impact value at an ordinary temperature.

Still another embodiment of the present invention provides such a system wherein the polyolefin based resin is a polypropylene resin, and the amorphous resin is at least one resin selected from the group of resins consisting of polystyrene resin, impact resistant polystyrene resin, modified polyphenylene ether resin, and mixtures thereof.

A still further embodiment of the present invention provides a system for absorbing energy from impacts, that system comprising: a blow molded energy absorbing member comprising; first and second opposing walls; at least one fused pair of first and second ribs disposed between the first and second opposing walls; the first recessed rib being integrally molded from the first wall and having a first recessed rib end; the second recessed rib is integrally molded from the second wall and having a second recessed rib end; the first and second recessed ribs being integrally fused at a welded surface disposed between the first and second recessed rib ends; the energy absorbing member comprising a thermoplastic, that thermoplastic comprising a polyolefin based resin and 50-75% by weight of an amorphous resin, and having a 15 to 40 kg/cm$^2$ Izod impact value at about approximately normal temperature.

Even another embodiment of the present invention provides such a system wherein the polyolefin based resin is a polypropylene resin, and the amorphous resin is at least one resin selected from the group consisting of polystyrene resin, impact resistant polystyrene resin, modified polyphenylene ether resin, and mixtures thereof.

An even further embodiment of the present invention provides a system for absorbing energy from an impact, that system comprising: an energy absorbing member comprising first and second opposing walls; the energy absorbing member comprising blow molded thermoplastic; at least one rib disposed between the first and second opposing walls; and the thermoplastic comprising a first resin, having a flexural modulus of not greater than about approximately 2,000 kg/cm², and a polyolefin based resin.

Still another embodiment of the present invention provides such a system wherein the first resin has a flexural modulus not greater than 200 kg/cm².

A still further embodiment of the present invention provides such a system wherein the first resin is at least one resin selected from the group of resins consisting of olefin based elastomers, styrene based elastomers, super low density polyethylene, straight chain-like low density polyethylene, low density polyethylene, straight chain-like super low density polyethylene and mixtures thereof.

Even still another embodiment of the present invention provides such a system wherein the polyolefin based resin is at least one resin selected from the group consisting of a polyethylene, a polypropylene and a mixture thereof.

An even still further embodiment of the present invention provides such a system wherein the first resin comprises an olefin based elastomer and the olefin based elastomer is at least one elastomer selected from the group consisting of ethylene-propylene copolymer rubber, ethylene-butene copolymer rubber, propylene-butene copolymer rubber, hydrogenation product of butadiene-styrene copolymer rubber, and mixtures thereof.

Yet another embodiment of the present invention provides such a system wherein the first resin is added to the polyolefin based resin in a proportion of about approximately between 3 to 20 parts by weight.

A yet further embodiment of the present invention provides such a system wherein the first resin to be added to the polyolefin based resin is a thermoplastics resin having a glass transition temperature not higher than about approximately −30° C.

A yet even further embodiment of the present invention provides a system for absorbing energy from an impact, that system comprising: a blow molded hollow energy absorbing member comprising; first and second opposing walls; at least one fused pair of first and second ribs disposed between the first and second opposing walls; the first recessed rib is integrally molded from the first wall and having a first recessed rib end; the second recessed rib is integrally molded from the second wall and having a second recessed rib end; the first and second recessed ribs being integrally fused at a welded surface disposed between the first and second recessed rib ends; the blow molded hollow impact absorbing member comprising a polypropylene resin and about approximately 3 to 20 parts by weight of an olefin based elastomer, the olefin based elastomer having a flexural modulus of not greater than 200 kg/cm² and a glass transition temperature not higher than −30° C.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5 is a cross-sectional view showing an embodiment with an energy absorbing member according to one embodiment of the invention provided inside a door trim of a vehicle.

FIG. 6 is a cross-sectional view showing an embodiment with an energy absorbing member according to one embodiment of the invention provided inside a rear pillar of a vehicle.

FIG. 11 is a graph showing the displacement with respect to the compression load of an energy absorbing member made of a PP resin.

DETAILED DESCRIPTION OF THE INVENTION

Figure 1:
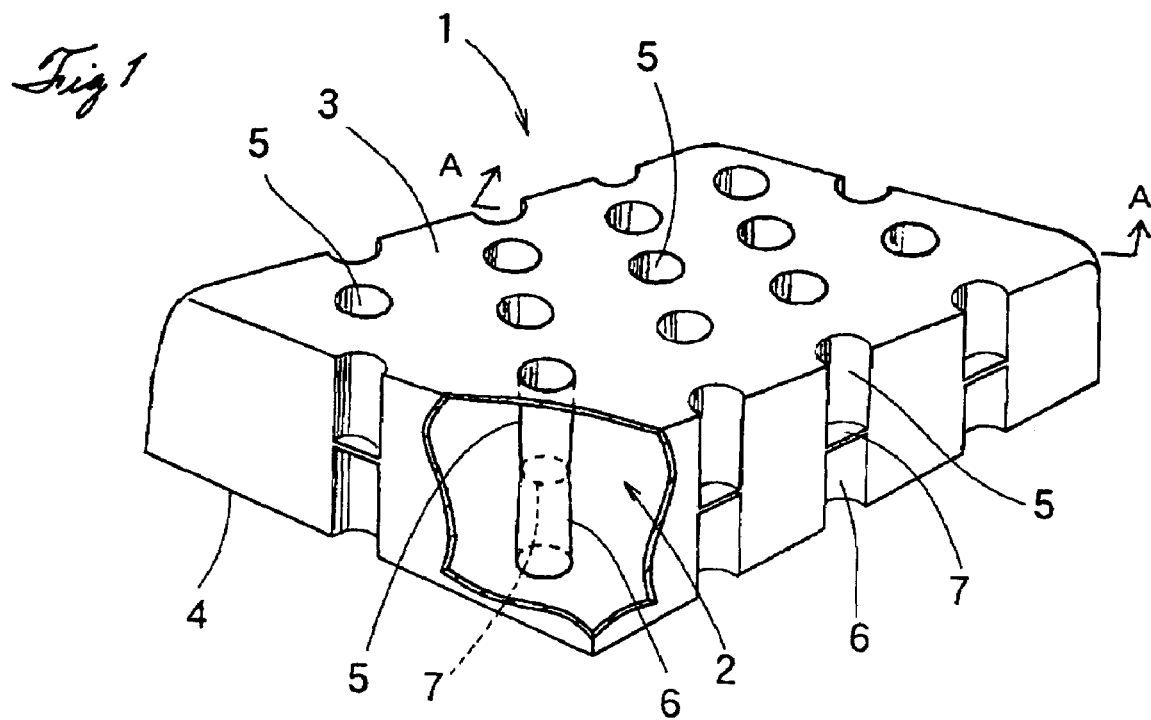
FIG. 1 is a partially broken perspective view showing an energy absorbing member according to an embodiment of the present invention.
Figure 2:
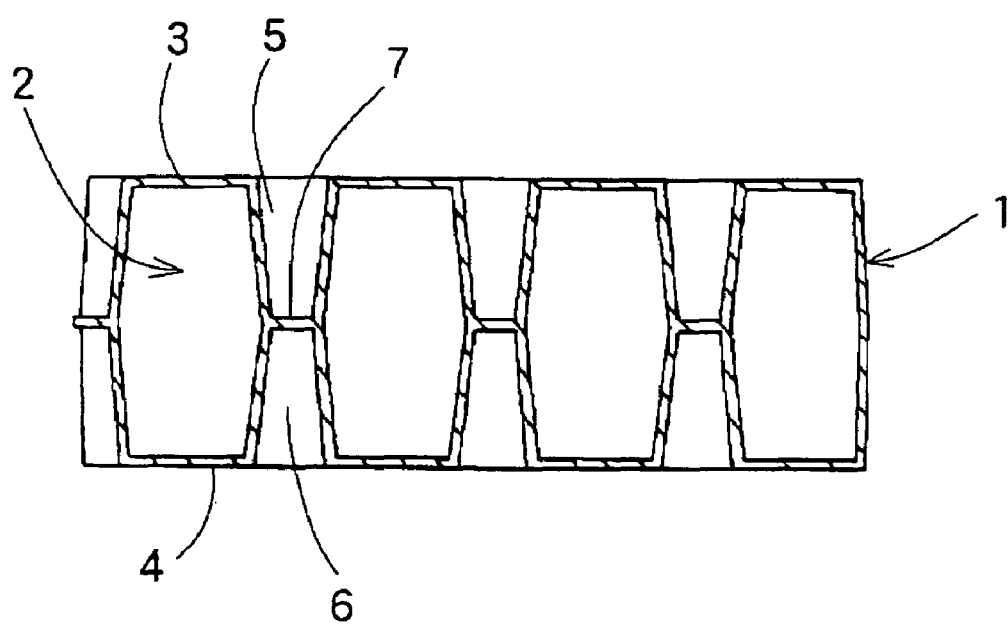
FIG. 2 is an enlarged cross-sectional view taken on the line A-A of FIG. 1.

In FIGS. 1 and 2, the reference numeral 1 denotes an energy absorbing member. The energy absorbing member 1 made of a thermoplastic resin, formed integrally by blow molding, has a hollow part 2, and a plurality of recessed ribs 5, 6 formed, in one embodiment by denting or impressing opposing first 3 and second 4 walls such that interior surfaces of ribs 5, 6 contact each other and meet, forming a joint 7. This joint may be welded, fused or otherwise configured so that the ribs are integrally joined.

The energy absorbing member is herein described, for the purposes of clarity, in the context of a vehicle. The term vehicle is intended in its broadest possible meaning, and includes but is not limited to automobiles, trucks, aircraft, boats, ships, tankers, carts, etc. One skilled in the art will readily appreciate that other, non-vehicular applications such as helmets, riot gear, and protective panels would also be within the scope of the present invention.

Figure 8:
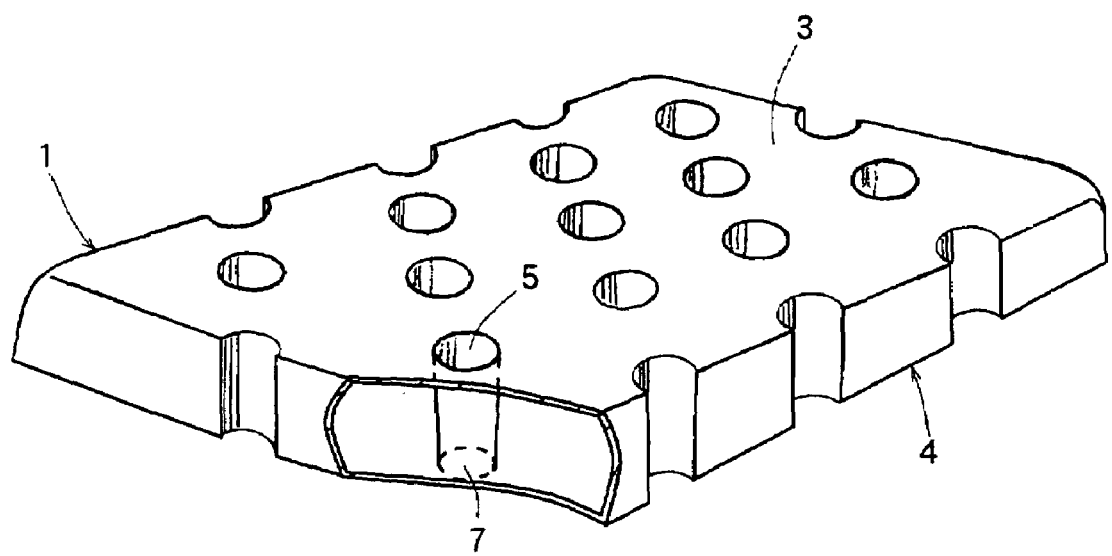
FIG. 8 is a partially broken perspective view showing an energy absorbing member according to another embodiment of the present invention.

According to one embodiment, the energy absorbing member 1 may have a configuration with the ribs provided by denting the first wall 3 toward the second wall 4 direction with the top end part bonded with the second wall 4, or by denting the second wall 4 toward the first wall 3 direction with the top end part bonded with the first wall 3 as shown in FIG. 8.

According to an alternative embodiment, the rib may be formed by impacting, impressing, or denting or otherwise molding the rib 5 into only one of the two walls 3, 4. This would produce a single rib rather than a pair of ribs.

An energy absorbing member 1 according to one embodiment of the present invention is made of thermoplastics produced by adding 35 to 75 wt % of an amorphous resin to a polyolefin based resin, having a 9,000 kg/cm2 to 22,000 kg/cm2 flexural modulus. As the polyolefin based resin, a polypropylene resin, a polyethylene resin, an ethylene-propylene copolymer resin, or the like can be used. In one embodiment a polypropylene resin is used. As the amorphous resin, at least one resin selected from the group consisting of a polystyrene resin, an impact resistant polystyrene resin, an acrylonitrile-butadiene-styrene resin, a polyphenylene ether resin, and a mixture thereof can be used. The thermoplastics for providing the energy absorbing member 1 have a 15 to 40 kg/cm2 Izod impact value at an ordinary temperature (about approximately 20° C.).

Figure 9:
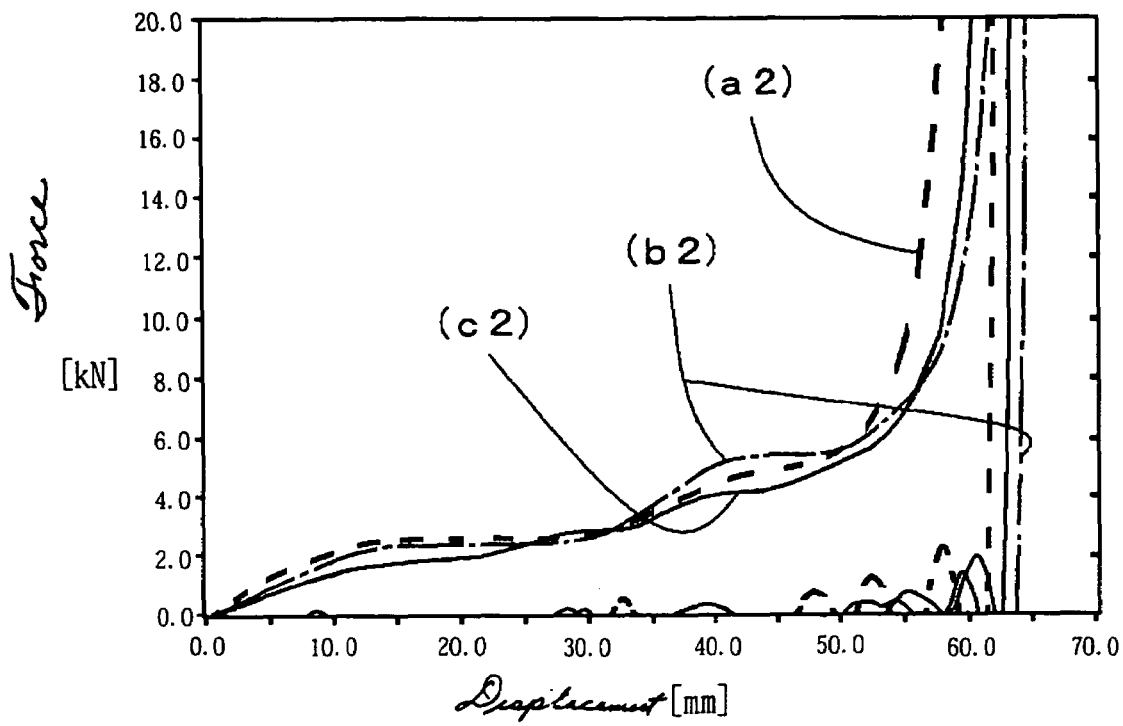
FIG. 9 is a graph showing the displacement with respect to the compression load of an energy absorbing member made of a resin with a modified PPE resin introduced to a PP resin.
Figure 10:
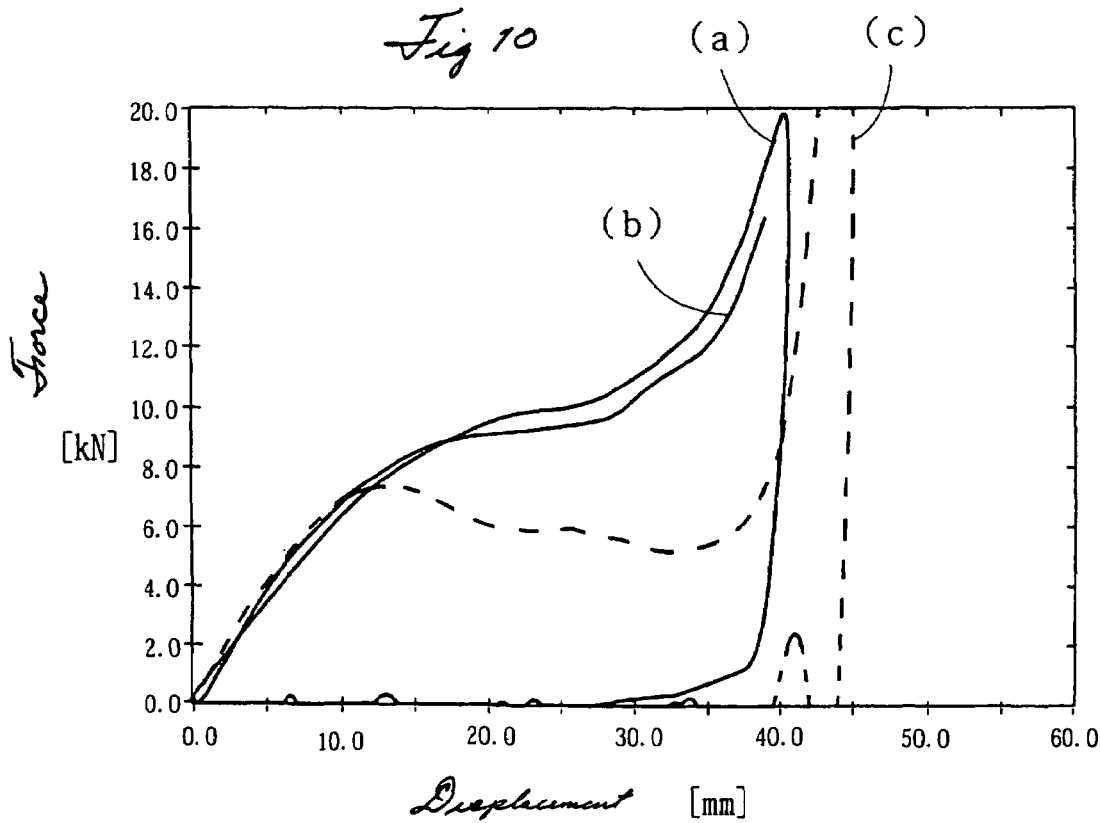
FIG. 10 is a graph showing the displacement with respect to the compression load of an energy absorbing member made of a resin with an olefin based elastomer introduced to a PP resin.

FIGS. 9 to 11 show the result of compressing the energy absorbing member 1 formed by blow molding and measuring displacement (change of the compression distortion) with respect to the compression loaded by a tensile tester. The curves (a1), (b1), (c1) shown in the graph of FIG. 11 show the displacement of the energy absorbing member 1 having a recessed rib, made of only a polypropylene resin with respect to the compression load in the environment of an ordinary or room temperature (about approximately 20° C.), −15° C., and 60° C., respectively. An ordinary temperature should be understood to mean a temperature approximately equal to ambient temperature.

In the graph of FIG. 11, the curves (b1), (c1) show the dramatically different values of the compression load at each displacement compared with the curve (a1) showing the displacement with respect to the compression load at an ordinary temperature (20° C.). The curve (b1) shows a larger value of the compression load thereof at 10 to 50 mm displacement than that of the curve (a1), and the curve (c1) shows a smaller value of the compression load thereof at 0 to 55 mm displacement than that of the curve (a1). Accordingly, the energy absorbing member formed only of a polypropylene resin has a large stress change with respect to temperature and the energy absorbing performance thereof is affected by the outside air temperature.

The curves (a2), (b2), (c2) in the graph of FIG. 9 show the displacement of the energy absorbing member 1 having a recessed rib, made of thermoplastics produced by adding 50 wt % of a modified polyphenylene ether resin (modified PPE) to a polypropylene (PP) resin with respect to the compression load in the environment of an ordinary temperature (20° C.), minus 15° C., and 60° C., respectively.

As shown in the graph of FIG. 9, according to the energy absorbing member 1 according to one embodiment of the invention, the curves (b2), (c2) illustrate compression load values at each displacement which are approximately equal to those illustrated in curve (a2) showing the displacement with respect to the compression load at an ordinary temperature (20° C.). That is, the curve (b2) shows the substantially same value of the compression load thereof at 0 to 50 mm displacement of the energy absorbing member as that of the curve (a2), and the curve (c2) also shows the substantially same value of the compression load thereof at 0 to 50 mm displacement of the energy absorbing member as that of the curve (a2). Accordingly, the energy absorbing member formed from an amorphous resin such as a polyphenylene ether resin added to a polypropylene resin has a smaller stress change with respect to the temperature so that the energy absorbing performance thereof is barely affected by the outside air temperature.

Although the case of using the modified polyphenylene ether resin as the amorphous resin is explained in the embodiment, the same effect can be obtained by using other amorphous resins such as a polystyrene resin (PS), an impact resistant polystyrene resin (HIPS), or the like. However, in the case of an impact resistant polystyrene resin, or the like being added, the Izod impact value tends to be changed significantly according to the composition ratio. Therefore, the Izod impact value should be specified in addition to the resin mixing ratio. The Izod impact value for the energy absorbing member should be 15 to 40 kg/cm2. As in the case of adding the modified polyphenylene ether resin, the temperature dependency of the energy absorbing member is improved by adding another amorphous resin.

TABLE 1

| | Resin mixing ratio PP/modified PPE | Stress change | | Izod impact value (kg/cm$^2$) |
|---|---|---|---|---|
| | | −15° C. | 60° C. | |
| Comparative Example 1 | 10/0 | +21% | −34% | — |
| Comparative Example 2 | 8/2 | +18% | −33% | 18 |
| Example 1 | 65/35 | +17% | −19% | 18 |
| Example 2 | 5/5 | 0% | −2% | 22 |
| Example 3 | 3/7 | +2% | −4% | 20 |

Table 1 shows the stress change ratio (%) and the Izod impact value (kg/cm$^2$) in the case of adding a modified polyphenylene ether resin (modified PPE) to a polypropylene resin (PP) with the mixing ratio changed. The stress change ratio is calculated with the load stress at an ordinary temperature with a 50% compression distortion of the energy absorbing member provided as the reference. The 50% compression distortion denotes the state within the energy absorbing member is deformed to the half thickness from the initial thickness by being crushed under the compression load. The results of Comparative Examples 1, 2 and Examples 1 to 3 are as follows.

COMPARATIVE EXAMPLE 1

An energy absorbing member was formed of only a polypropylene resin without adding a modified polyphenylene ether resin. The stress change ratio with the ordinary temperature, 50% displacement provided as the reference was 21% at −15° C., and it was −34% at 60° C. That is, the compression load is made higher at a low temperature, and the compression load is made lower at a high temperature.

COMPARATIVE EXAMPLE 2

An energy absorbing member was formed of a thermoplastic resin produced by adding 20 wt % of a modified polyphenylene ether resin to a polypropylene resin. In this case, the same result as in the comparative example 1 was obtained.

EXAMPLE 1

An impact energy absorbing member was formed of a thermoplastic resin produced by adding 35 wt % of a modified polyphenylene ether resin to a polypropylene resin. In this case, the stress change ratio was improved in particular at 60° C. by the addition of the modified polyphenylene ether so that the energy absorbing property change with respect to the temperature change is reduced.

EXAMPLE 2

An energy absorbing member was formed of a thermoplastic resin produced by adding 50 wt % of a modified polyphenylene ether resin to a polypropylene resin.

EXAMPLE 3

An energy absorbing member was formed of a thermoplastic resin produced by adding 70 wt % of a modified polyphenylene ether resin to a polypropylene resin.

According to the Examples 2, 3, the energy absorbing property change was reduced to a considerable degree by the addition of the polyphenylene ether resin so that an energy absorbing member with a diminished temperature dependency was obtained.

An energy absorbing member 1, according to one embodiment of the present invention, is made of thermoplastics with a soft polymer having a 2,000 kg/cm2 or less, particularly preferably 200 kg/cm2 or less flexural modulus added to a polyolefin based resin. Thereby, the energy absorbing property can be provided having a diminished dependence on temperature fluctuations at low temperatures, in particular at −30° C. owing to the multiplier effect of the ribs provided in the energy absorbing member and the composition of a soft resin.

The energy absorbing member 1 formed by blow molding was compressed by a tensile tester, and displacement (change of the compression distortion) was measured with respect to the compression load. The result is shown in FIG. 10. The curve (a) in the graph of FIG. 10 shows the displacement of the energy absorbing member 1 having a recessed rib without addition of a soft resin, at an ordinary temperature. The impact energy is sufficiently absorbed by supporting a high load without lowering the compression load even in the case the displacement of the energy absorbing member advances 15 mm. In contrast, the curve (c) in the graph shows the displacement at −30° C. with respect to the compression load, of the energy absorbing member 1 having a recessed rib without addition of a soft resin. The compression load is lowered from the 10 mm displacement of the energy absorbing member, so that a desirable energy absorbing property was not obtained. That is, according to the energy absorbing member 1 without addition of a soft resin, the member 1 is vulnerable to destruction resulting from stress cracks, and, as a result, at −30° C., is unable to absorb the energy from an impact, as required.

By adding a soft resin, a preferable energy absorbing property can be provided even at low temperature as shown in the curve (b) in the graph in FIG. 10. The curve (b) showed in the graph shows the displacement at −30° C. with respect to the compression load in the case of adding a soft resin. Compared with the graph (c), the compression load decline is restrained from the 10 mm displacement as a result of the addition composition of the soft resin so that a desired energy absorbing property was provided. That is, by providing the energy absorbing member 1 having a recessed rib formed of thermoplastics including a polyolefin based resin such as a polypropylene as the base material resin and 3 to 20 parts by weight of a soft resin such as a olefin based elastomer, the temperature dependency can be restrained and damage from impact energy can be prevented or minimized, without hardening of the energy absorbing member 1 even at low temperature of −30° C. and a desirable energy absorbing property can be obtained. Moreover, since the energy absorbing property at −30° C. is required to the energy absorbing member of a vehicle, the soft resin to be added should have the glass transition temperature or the vulnerable temperature at −30° C. or lower.

As the resin having a 2,000 kg/cm2 or less flexural modulus should be added to a polyolefin based resin, it needs to have an excellent mixing property with respect to a polyolefin based resin as the base material resin. An olefin based elastomer, a styrene based elastomer, a low density polyethylene, and a straight chain-like low density polyethylene, a super low density polyethylene, and a straight chain-like super low density polyethylene are preferable. In particular, a desired energy absorbing property can be obtained by adding 3 to 20 parts by weight of an olefin based elastomer to a polyolefin based resin as the base material resin.

As an olefin based elastomer, an ethylene-propylene copolymer rubber, an ethylene-butene copolymer rubber, a propylene-butene copolymer rubber, a hydrogenation product of a butadiene-styrene copolymer rubber, or the like can be used. As a styrene based elastomer, a styrene-butadiene block copolymer, a styrene-butadiene-styrene block copolymer, a styrene-isoprene-block copolymer, a styrene-isoprene-styrene block copolymer, and a hydrogenation product thereof can be used. These elastomers have a good mixing property with respect to a polyolefin based resin.

Figure 3:
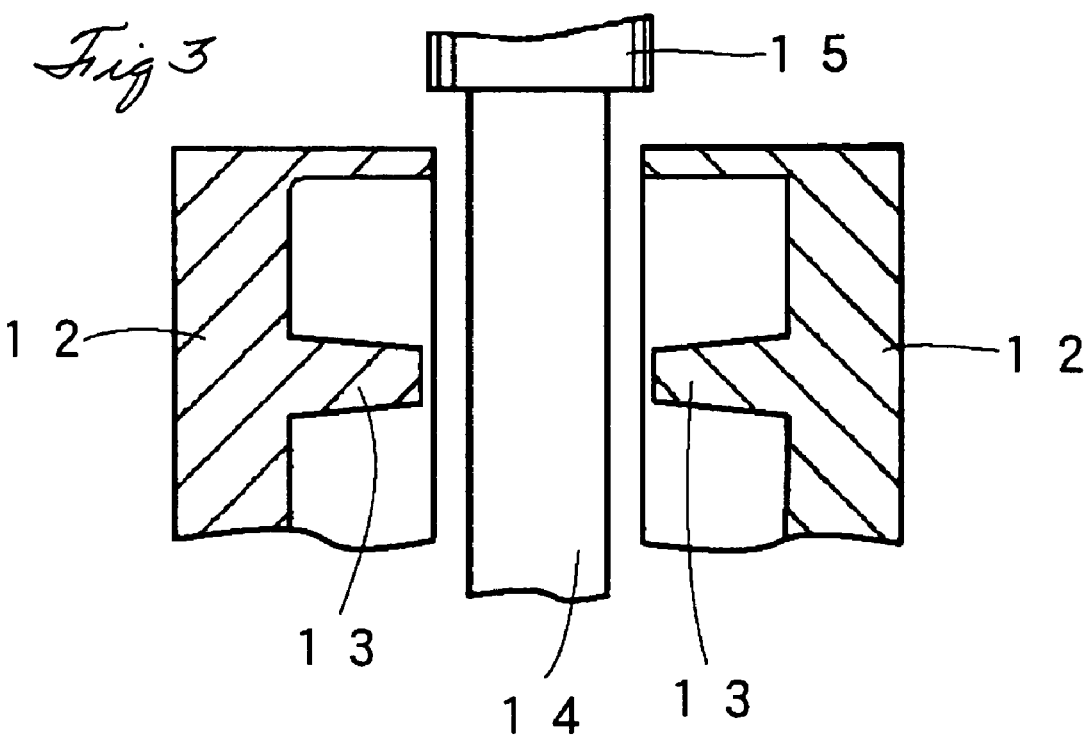
FIG. 3 is a view showing a first step for molding an energy absorbing member according to one embodiment of the invention by blow molding.
Figure 4:
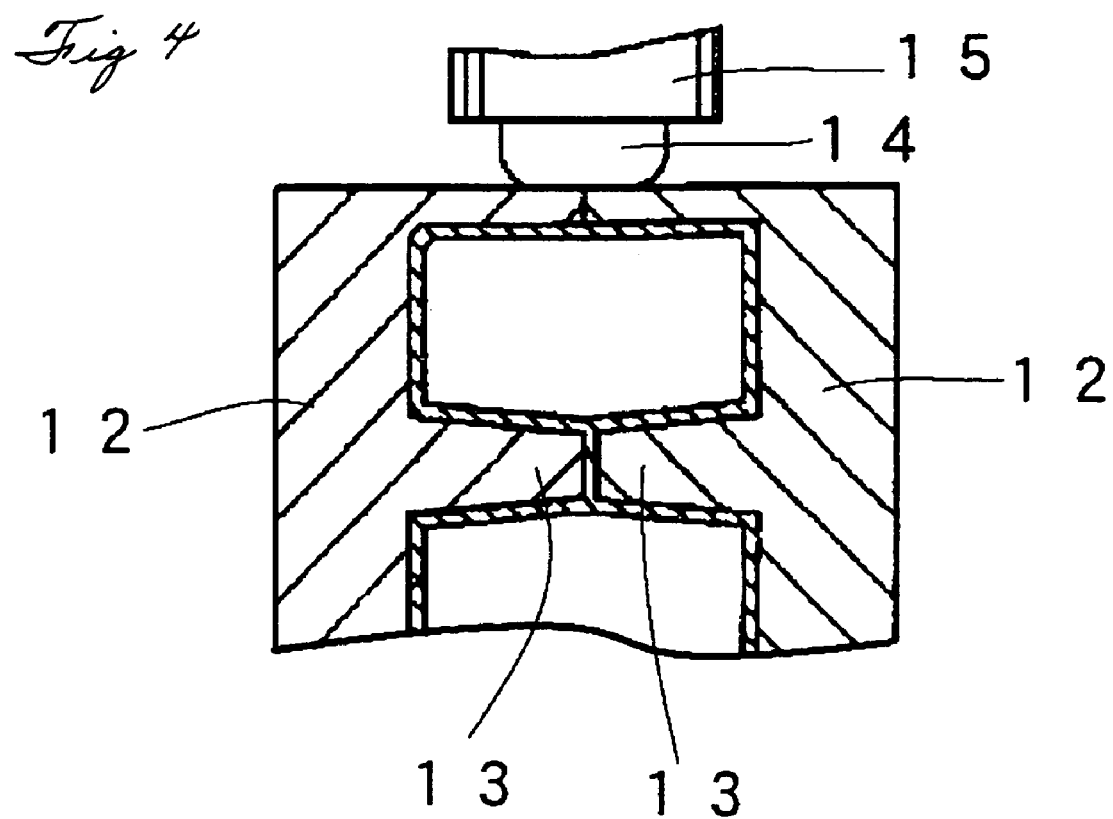
FIG. 4 is a view showing a second step for molding an energy absorbing member according to one embodiment of the invention by blow molding.

The energy absorbing member 1 according to one embodiment of the invention is blow molded as shown in FIGS. 3 and 4. The reference numerals 12, 12 are a pair of split mold halves. The split mold halves 12, 12 are provided with recessed rib forming parts 13, 13 for forming the recessed ribs 5, 6. The reference numeral 14 denotes a parison and 15 an extrusion head.

Figure 7:
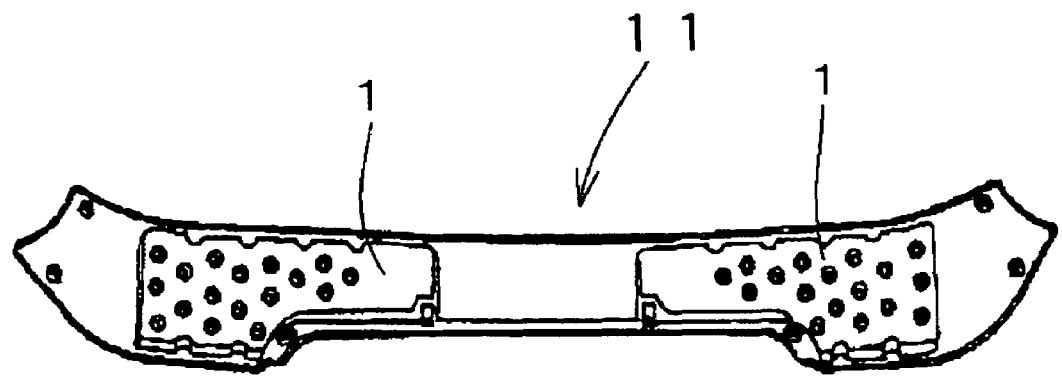
FIG. 7 is a rear view of a rear bumper with an energy absorbing member according to one embodiment of the invention provided therein.

The energy absorbing member 1 according to one embodiment of the invention is provided inside a vehicle structural member such as a door of, a door trim, a body side panel, a roof panel, a pillar, a bumper, a seat, and an instrument panel, or the like. FIG. 5 shows an embodiment of providing the energy absorbing member 1 according to one embodiment of the invention inside a door trim 8 of a door 9. FIG. 6 shows an embodiment of providing the same inside a rear pillar 10 of an automobile, and FIG. 7 shows an embodiment of providing the same inside a rear bumper 11. In FIG. 6, the mark A denotes a head of a passenger.

The thermoplastic comprising the present invention is, in one embodiment, a thermoplastic polymer alloy, wherein the typically immiscible thermoplastic components are blended using a micro-dispersion technique or block or grafting polymerization processes. In these latter processes, the copolymers are chemically bonded or grafted, thereby combining into a unified polymer, rather than two or more polymers coexisting and retaining their independent characters. In both the microdispersion process, a fundamentally mechanical combination, and in the block or grafting polymerization processes, which are fundamentally chemical in nature, an alloy of highly amalgamated and integrated components is produced. In this way, the alloy is more uniform in the dispersion of the elastomer within the resin than would be achieved with known blending techniques. To achieve even better alloying, a compatibility accelerator (for example epoxy compound, diene rubber) may be added to the thermoplastic/elastomer mixture. To this intimate mixture of components within the alloy is attributed the beneficial characteristics exhibited by this embodiment of the present invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

We claim:

1. A system for absorbing energy from an impact, said system comprising:
   an energy absorbing member comprising first and second opposing walls;
   at least one rib disposed between said first and second opposing walls;
   said energy absorbing member consisting of a thermoplastic polymer alloy having a 15 to 40 kg/cm² Izod impact value at an ambient temperature, said thermoplastic polymer alloy consisting of a polyolefin based resin and 50-75% by weight of an amorphous resin which is at least one resin selected from the group of resins consisting of polystyrene resin, impact resistant polystyrene resin, modified polyphenylene ether resin, and mixtures thereof, and said energy absorbing member having the stress change ratio within 15% at the temperature from −15° to 60° C. with respect to the compression distortion at ordinary temperature.

2. The system according to claim 1, wherein said polyolefin based resin is an ethylene-propylene copolymer.

3. The system according to claim 1, wherein said thermoplastic polymer alloy comprises said polyolefin and said amorphous resin combined in a microdispersion.

4. The system according to claim 1, wherein said thermoplastic polymer alloy comprises said polyolefin and said amorphous resin combined by block polymerization.

5. The system according to claim 1, wherein said thermoplastic polymer alloy comprises said polyolefin and said amorphous resin combined by graft polymerization.

6. A system for absorbing energy from impacts, said system comprising:
   a blow molded energy absorbing member comprising;
   first and second opposing walls;
   at least one fused pair of first and second recessed ribs disposed between said first and second opposing walls;
   said first recessed rib being integrally molded from said first wall and having a first recessed rib end;
   said second recessed rib is integrally molded from said second wall and having a second recessed rib end;
   said first and second recessed ribs being integrally fused at a welded surface disposed between said first and second recessed rib ends;
   said energy absorbing member consisting of a thermoplastic polymer alloy, said thermoplastic polymer alloy consisting of a polyolefin based resin and 50-75% by weight of an amorphous resin which is at least one resin selected from the group of resins consisting of polystyrene resin, impact resistant polystyrene resin, modified polyphenylene ether resin, and mixtures thereof, and having a 15 to 40 kg/cm² Izod impact value at about approximately normal temperature, and said energy absorbing member having the stress change ratio within 15% at the temperature from −15° to 60° C. with respect to the compression distortion at ordinary temperature.

7. The system according to claim 6, wherein said thermoplastic polymer alloy comprises said polyolefin and said amorphous resin combined in a microdispersion.

8. The system according to claim 6, wherein said thermoplastic polymer alloy comprises said polyolefin and said amorphous resin combined by block polymerization.

9. The system according to claim 6, wherein said thermoplastic polymer alloy comprises said polyolefin and said amorphous resin combined by graft polymerization.

10. The system according to claim 6, wherein said polyolefin based resin is an ethylene-propylene copolymer resin.

11. A system for absorbing energy from an impact, said system comprising:
    a hollow energy absorbing member comprising first and second opposing walls;
    said energy absorbing member comprising blow molded thermoplastic;
    at least one fused pair of first and second recessed ribs disposed between said first and second opposing walls;
    said first recessed rib is integrally molded from said first wall and having a first recessed rib end;
    said second recessed rib is integrally molded from said second wall and having a second recessed rib end;
    said first and second recessed ribs being integrally fused at a welded surface disposed between said first and second recessed rib ends; and
    said thermoplastic consisting of a polyolefin based resin and about approximately 3 to 20 parts by weight of a first resin which is at least one resin selected from the group of resins consisting of olefin based elastomers, styrene based elastomers, low density polyethylene, straight chain-like low density polyethylene and mixtures thereof, said first resin having a flexural modulus of not greater than about approximately 2,000 kg/cm², and a glass transition temperature not higher than −30° C., and said energy absorbing member having the stress change ratio within 15% at −30° C. with respect to the compression distortion at ordinary temperature.

12. The system according to claim 11, wherein the polyolefin based resin is an ethylene-propylene copolymer resin.

13. The system according to claim 11, wherein said first resin comprises:
    an olefin based elastomer, said olefin based elastomer is at least one elastomer selected from the group consisting of ethylene-propylene copolymer rubber, ethylene-butene copolymer rubber, propylene-butene copolymer rubber, hydrogenation product of butadiene-styrene copolymer rubber, and mixtures thereof.

14. The system according to claim 11, wherein said thermoplastic comprises said first resin and a second amorphous resin combined in a microdispersion.

15. The system according to claim 11, wherein said thermoplastic comprises said first resin and a second resin combined by block polymerization.

16. The system according to claim 11, wherein said thermoplastic comprises said first resin and a second resin combined by graft polymerization.

* * * * *